United States Patent [19]

Boutni

[11] Patent Number: 4,873,277

[45] Date of Patent: Oct. 10, 1989

[54] AROMATIC CARBONATE RESIN EXHIBITING IMPROVED IMPACT PROPERTIES

[75] Inventor: Omar M. Boutni, Mt. Vernon, Ind.

[73] Assignee: General Electric Company, Mt. Vernon, Ind.

[21] Appl. No.: 925,681

[22] Filed: Oct. 31, 1986

[51] Int. Cl.$^4$ ................................................. C08K 5/41
[52] U.S. Cl. ..................................... 524/166; 524/165; 524/508; 524/611; 525/146
[58] Field of Search ............... 524/156, 166, 508, 611, 524/165, 157

[56] References Cited

U.S. PATENT DOCUMENTS

| 3,940,366 | 2/1976 | Mark | 524/164 |
| 4,007,155 | 2/1977 | Mark | 524/166 |
| 4,214,062 | 7/1980 | Binsack et al. | 524/165 |
| 4,430,476 | 1/1984 | Liu | 525/67 |
| 4,438,231 | 3/1984 | Liu | 524/161 |
| 4,529,761 | 7/1985 | Lohmeijer | 524/166 |
| 4,532,283 | 7/1985 | Liu | 524/166 |
| 4,554,309 | 11/1985 | Mark et al. | 524/157 |
| 4,600,742 | 7/1986 | Higgins | 524/166 |
| 4,649,168 | 3/1987 | Kress et al. | 524/165 |
| 4,673,699 | 6/1987 | Krishnan et al. | 524/89 |
| 4,804,700 | 2/1989 | Allen | 524/166 |

FOREIGN PATENT DOCUMENTS 2828107  1/1979  Fed. Rep. of Germany ...... 524/156

Primary Examiner—John C. Bleutge
Assistant Examiner—David W. Woodward
Attorney, Agent, or Firm—Martin B. Barancik

[57] ABSTRACT

An aromatic carbonate resin composition exhibiting improved impact properties comprised of:
(i) at least one aromatic carbonate resin;
(ii) at least one effective amount of at least one impact modifier; and
(iii) an amount effective to improve the impact properties of (i) and (ii) but insufficient to substantially deleteriously affect, to a substantial degree, most of the advantageous properties thereof of at least one aliphatic sulphonate.

8 Claims, No Drawings

AROMATIC CARBONATE RESIN EXHIBITING IMPROVED IMPACT PROPERTIES

BACKGROUND OF THE INVENTION

Aromatic carbonate resins are well known thermoplastic materials which due to their many advantageous physical and mechanical properties find use as thermoplastic engineering materials. The aromatic carbonates exhibit, for example, excellent properties of toughness, flexibility, and high heat distortion temperatures. The aromatic carbonates and methods for their preparation are disclosed, inter alia, in U.S. Pat. Nos. 2,964,974, 2,999,835, 3,169,121, 3,028,365, 3,334,154, 3,275,601 and 3,915,926.

However, these aromatic carbonates generally suffer from low critical thickness values, i.e., the thickness at which a discontinuity in Izod impact values occurs. These low critical thickness values tend to limit wall thickness of molded articles to a thickness below the critical thickness. The aromatic carbonate resins exhibit notched Izod impact values which are dependent on the thickness of the resin article. Thus, for example, while typical notched Izod impact values of one-eighth inch thick polycarbonate test specimens are generally in the range of about 16 foot pounds per inch, typical notched Izod impact values for a one-fourth inch thick polycarbonate test specimen are generally in the range of about 2 foot pounds per inch. The relatively high Izod values of the one-eighth inch thick polycarbonate test specimens are due to the fact that these specimens are thinner than the critical thickness of the polymer and, therefor, upon impact a hinged or ductile break occurs. The low Izod impact values of the one-fourth inch thick polycarbonate test specimens are due to the fact that these specimens exceed the critical thickness of the polymer and, therefore, upon impact a clean or brittle break occurs.

It is well known in the art, and amply described in the patent literature, that the impact properties of aromatic carbonate polymers can be improved by blending an impact modifier with these aromatic carbonate resins. These impact modifiers include the polacrylates, polyolefins such as linear low density polyethylene, rubbery dienic resins such as ethylene propylene diene terpolymers, and styrenic resins. However, in order to significantly improve the impact properties of aromatic carbonate resins these impact modifiers must be present in relatively large amounts, e.g. typically at least about 4 weight percent based on the amount of impact modifier and aromatic carbonate resin.

It would thus be very advantageous if aromatic carbonate resin compositions could be provided which, while exhibiting substantially equivalent impact properties to those obtained using these relatively high loadings of conventional impact modifiers, did so utilizing lower concentrations of these impact modifiers. It is, therefore, an object of the instant invention to provide such aromatic carbonate resin compositions.

FIELD OF THE INVENTION

The instant invention is directed to aromatic carbonate resin compositions exhibiting improved impact properties. More particularly, the instant invention is directed to aromatic carbonate resins which are blended with an amount effective to improve the impact properties thereof after an impact modifier combination comprised of a conventional impact modifier and an aliphatic sulphonate.

SUMMARY OF THE INVENTION

In accordance with the instant invention there are provided aromatic carbonate resin compositions comprised of at least one thermoplastic aromatic carbonate resin and an amount effective to improve the impact properties thereof of an impact modifier comprising, in combination, at least one conventional impact modifier and a synergistic amount of at least one anionic aliphatic sulphonate.

DESCRIPTION OF THE INVENTION

It has been discovered that the impact properties of aromatic carbonate resins can be positively upgraded by utilizing lower loadings of conventional impact modifiers than presently used by the incorporation into an aromatic carbonate resin composition containing at least one aromatic carbonate resin and a relatively low amount of impact modifier at least one anionic aliphatic sulphonate. The presence of relatively small quantities of this anionic aliphatic sulphonate results in the instant compositions exhibiting impact properties generally equivalent to conventional impact modified compositions which typically contain at least about 4 weight percent of a conventional impact modifier at lower loadings, e.g., 50% or less, of said impact modifier. The combination of the conventional impact modifier with the anionic aliphatic sulphonate thus appears to have a surprising effect upon the upgrading of the impact properties of the aromatic carbonate resins. The instant invention thus provides improvements in impact properties of aromatic carbonate resins which are generally comparable to those obtained in conventional prior art compositions while using significantly lower loadings of impact modifier than was previously possible.

The instant invention is thus an improved aromatic carbonate resin composition exhibiting improved impact properties comprising at least one aromatic carbonate resin and an amount effective to improve the impact properties thereof of at least one impact modifier; the improvement comprising said composition additionally containing a minor amount of at least one anionic aliphatic sulphonate.

Certain compositions of the invention having somewhat higher levels of either polyolefin and/or aliphatic sulfphonates also exhibit improved processing as compared to compositions containing only the impact modifier at lower levels.

The aromatic carbonate resins of the instant invention include the polycarbonate resins and the copolyestercarbonate resins. The polycarbonate resins are conventional well known materials which are generally commercially available or may be readily prepared by known methods. These polycarbonates, as well as methods for their preparation, are described, inter alia, in U.S. Pat. Nos. 3,161,615, 3,220,973, 3,312,659, 3,312,660, 3,313,777, 3,666,614 and 3,393,672, all of which are incorporated herein by reference. The polycarbonates may be prepared by a variety of known methods, including the interfacial polymerization process which involves the coreaction of at least one dihydric phenol with a carbonate precursor. The polycarbonate resins contain at least one recurring or repeating structural unit represented by the formula

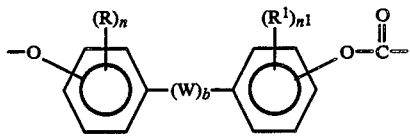  I.

wherein:

R and $R^1$ are independently selected from monovalent hydrocarbon radicals, monovalent hydrocarbonoxy radicals, and halogen radicals;

W is selected from divalent hydrocarbon radicals, —S—, —S—S—, —O—,

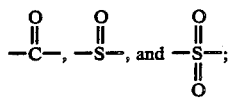

n and $n^1$ are independently selected from integers having a value of from 0 to 4 inclusive;

and b is either zero or one.

The monovalent hydrocarbon radicals represented by R and $R^1$ include the alkyl, cycloalkyl, aryl, aralkyl and alkaryl radicals. The preferred alkyl radicals are those containing from 1 to about 12 carbon atoms. The preferred cycloalkyl radicals are those containing from about 4 to about 8 ring carbon atoms. The preferred aryl radicals are those containing from 6 to 12 ring carbons, i.e., phenyl, biphenyl, and naphthyl. The preferred aralkyl and alkaryl radicals are those containing from 7 to about 14 carbon atoms.

The preferred halogen radicals represented by R and $R^1$ are chlorine and bromine.

The monovalent hydrocarbonoxy radicals represented by R and $R^1$ may be represented by the formula —$OR^2$ wherein $R^2$ is a monovalent hydrocarbon radical of the type described hereinafore. Preferred hydrocarbonoxy radicals are the alkoxy and aryloxy radicals.

The divalent hydrocarbon radicals represented by W include the alkylene, alkylidene, cycloalkylene, and cycloalkylidene radicals. The preferred alkylene radicals are those containing from 2 to about 20 carbons. The preferred alkylidene radicals are those containing from 1 to about 20 carbons. The preferred cycloalkylene and cycloalkylidene radicals are those containing from 6 to about 16 ring carbon atoms.

Typically, the dihydric phenols utilized in the preparation of the polycarbonate resins may be represented by the general formula

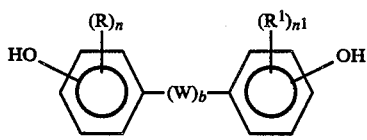  II.

wherein R, $R^1$, n, $n^1$, W and b are as defined hereinafore.

Some illustrative non-limiting examples of dihydric phenols falling within the scope of Formula II include:
2,2-bis(4-hydroxyphenyl)propane (bisphenol-A);
2,2-bis(3,5-dibromo-4-hydroxyphenyl)propane;
2,2-bis(3,5-dimethyl-4-hydroxyphenyl)propane;
2,2-bis(3-bromo-5-methyl-4-hydroxyphenyl)propane;
1,1-bis(4-hydroxyphenyl)cyclohexane;
1,1-bis(4-hydroxyphenyl)cyclododecane;
1,1-bis(3,5-dimethyl-4-hydroxyphenyl)cyclododecane;
1,1-bis(4-hydroxyphenyl)decane;
1,4-bis(4-hydroxyphenyl)butane;
bis(4-hydroxyphenyl)methane;
4,4'-thiodiphenol; and
bis(4-hydroxyphenyl)ether.

Other dihydric phenols which are useful are described in U.S. Pat. Nos. 2,998,835, 3,028,365 and 3,334,154, all of which are incorporated herein by reference.

The carbonate precursor may be a carbonyl halide, a carbonate ester, or a bishaloformate. The carbonyl halides may be carbonyl bromide, carbonyl chloride, or mixtures thereof. The carbonate esters may be diphenyl carbonate; di(halophenyl)carbonate such as di(bromophenyl) carbonate, di(chlorophenyl)carbonate; and di(tribromophenyl)carbonate; di(alkylphenyl)carbonates such as di(tolyl)carbonate; di(naphthyl)carbonate; chlorophenyl chloronaphthyl carbonate; and phenyl tolyl carbonate. The bishaloformates that can be used include the bishalformates of dihydric phenols such as the bischloroformates of bisphenol-A and hydroquinone; and the bis-haloformates of glycols such as the bischloroformates of ethylene glycol, neopentyl glycol, and polyethylene glycol. The preferred carbonate precursor is carbonyl chloride, also known as phosgene.

Among the processes used for the preparation of the polycarbonates are the pyridine process, the interfacial polymerization process, transesterification, and melt polymerization. A convenient process for the preparation of the polycarbonate resins is the interfacial polymerization process. This process utilizes two different solvent media which are immiscible. One solvent medium is an aqueous basic medium. The other solvent medium is an organic medium such as methylene chloride which is immiscible with said aqueous medium. Also employed in the interfacial polymerization process are molecular weight regulators which control the chain length or molecular weight of the polymer by a chain terminating mechanism, and catalysts. The molecular weight regulators are well known in the art and include, but are not limited to, phenol itself, p-tertiarybutyl phenol, and chroman-I. The catalysts are also well known in the art and include, but are not limited to, tertiary amines such as triethylamine, quaternary ammonium compounds such as tetraethylammonium bromide, and quaternary phosphonium compounds such as n-butyltriphenyl phosphonium.

Also included with the scope of the term polycarbonates are the randomly branched thermoplastic polycarbonates wherein a branching agent, which is generally a polyfunctional aromatic compound, is reacted with the dihydric phenol and the carbonate precursor. These polyfunctional aromatic compounds are used in minor amounts, i.e., amounts effective to provide branching, and contain at least three functional groups which may be carboxyl, carboxylic anhydride, haloformyl, and mixtures thereof. Some illustrative non-limiting examples of these aromatic polyfunctional compounds which may be employed as branching agents include trimellitic anhydride, trimellitic acid, trimellityl trichloride, 4-chloroformyl phthalic anhydride, pyromellitic acid, pyromellitic dianhydride, mellitic acid, mellitic anhydride, trimesic acid, and benzophenonetetracarboxylic acid.

The copolyester-carbonate resins are well known in the art and are described along with methods for their preparation in U.S. Pat. Nos. 3,169,121, 4,238,596, 4,156,069 and 4,238,697, all of which are incorporated herein by reference.

Briefly stated the high molecular weight thermoplastic aromatic copolyester-carbonates comprise recurring carbonate groups, carboxylate groups, and aromatic carbocyclic groups in the polymer chain in which at least some of the carbonate groups and at least some of the carboxylate groups are bonded directly to the ring carbon atoms of the aromatic carbocyclic groups. These copolyester-carbonate resins contain ester bonds and carbonate bonds in the polymer chain, wherein the amount of the ester bonds is in the range of from about 25 to about 90 mole percent, preferably from about 35 to about 80 mole percent. For example, 5 moles of bisphenol-A reacting completely with 4 moles of isophthaloyl dichloride and one mole of phosgene would give a copolyester-carbonate of 80 mole percent ester bonds.

These copolyester-carbonates may be readily prepared by the interfacial polymerization process by the reaction of (i) at least one dihydric phenol, (ii) a carbonate precursor, and (iii) an ester precursor. The dihydric phenols and the carbonate precursors are of the type described hereinafore. The ester precursor may be a difunctional carboxylic acid or, preferably, its ester forming reactive derivative such as a diacid halide, e.g., isophthaloyl dichloride, terephthaloyl dichloride, and mixtures thereof. Some useful difunctional acids are set forth in U.S. Pat. No. 3,169,121, incorporated herein by reference. The preferred copolyestercarbonate for impact purposes are those having an ester content of greater than 50 percent, more preferably greater than 70 percent isophthalate.

The impact modifiers used in the compositions of the instant invention are well known in the art and serve to upgrade the impact properties of aromatic carbonate resins. Examples of these impact modifiers include, but are not limited to, the following general categories:
polyacrylates;
polyolefins;
styrenic resins; and
rubbery dienic polymers.

The polyacrylates which may be employed as impact modifiers are rubbery homopolymers or copolymers. In general the polyalkylacrylates described in Brinkman et al. U.S. Pat. No. 3,581,659, incorporated herein by reference, can be used, especially those containing units derived from alkyl acrylates, particularly n-butyl acrylate. Acrylate containing copolymers wherein the other monomer is, for example, derived from a methacrylate are also employable, see for example Japanese Patent Application Announcement 1968-18611, incorporated herein by reference. Preferably the acrylate resin will be in the form of a rubber-elastic graft copolymer having a glass transition temperature below about −20° C., Schlichting, U.S. Pat. No. 4,022,748, incorporated herein by reference. More preferably, the acrylate resin will comprise a multiple state polymer having a rubbery first stage (core) and a thermoplastic hard final stage (shell), see Farnham, U.S. Pat. No. 4,096,202, incorporated herein by reference.

The most preferred acrylate resin is a multiacrylate composite interpolymer comprised of a $C_1$–$C_5$ acrylate and a $C_1$–$C_5$ methacrylate. These interpolymers consist of about 25 to 95 weight percent of a first elastomeric phase polymerized from a monomer system comprising about 77 to 99.8 weight percent of a $C_1$–$C_5$ alkyl acrylate, 0.1 to 5 weight percent of crosslinking monomer, 0.1 to 5 weight percent of graftlinking monomer, and about 75 to 5 weight percent of a final rigid thermoplastic phase polymerized in the presence of said elastomeric phase.

The crosslinking monomer is polyethylenically unsaturated monomer having a plurality of addition polymerizable reactive groups which all polymerize at substantially the same rate of reaction. Suitable crosslinking monomers include the polyacrylic and polymethacrylic esters of polyols such as butylene diacrylate and dimethacrylate, trimethylol propane trimethacrylate, and the like; di- and trivinyl benzene, vinyl acrylate and methacrylate, and the like, Preferred crosslinking monomer is butylene diacrylate.

The graftlinking monomer is polyethylenically unsaturated monomer having a plurality of addition polymerizable reactive groups, at least one of which polymerizes at substantially different rates of polymerization from at least one other of said reactive groups. The function of the graftlinking monomer is to provide a residual level of unsaturation in the elastomeric phase, particularly in the latter stages of polymerization and, consequently, at or near the surface of the elastomer particles.

When the rigid thermoplastic phase is subsequently polymerized at the surface of the elastomer, the residual unsaturated addition polymerizable reactive group contributed by the graftlinking monomer participates in the subsequent reaction so that at least a portion of the rigid phase is chemically attached to the surface of the elastomer. Among the effective graftlinking monomers are alkyl group containing monomers of alkyl esters of ethylenically unsaturated acids such as allyl acrylate, allyl methacrylate, diallyl maleate, diallyl fumarate, and allyl acid itaconate. Somewhat less preferred are the diallyl esters of polycarboxylic acids which do not contain polymerizable unsaturation. The preferred graftlinking monomers are allyl methacrylate and diallyl maleate.

A most preferred interpolymer has only two stages, the first stage comprising about 60 to 95 percent by weight of the interpolymer and being polymerized from a monomer system comprising 95 to 99.8 percent by weight butyl acrylate, 0.2 to 2.5 weight percent butylene diacrylate as crosslinking agent, 0.1 to 2.5 percent by weight allyl methacrylate or diallyl maleate as a graftlinking agent, with a final stage polymerized from about 60 to 100 percent by weight methyl methacrylate, butyl acrylate, 0.1 to 2.5 percent by weight butylene diacrylate as crosslinking agent, 0.1 to 2.5 percent by weight allyl methacrylate or diallyl maleate as a graftlinking agent, with a final stage polymerized from about 60 to 100 percent by weight methyl methacrylate. The multiphase composite interpolymer Acryloid KM-330 available from Rohm and Haas is preferred. This interpolymer is comprised of small quantities of cross-linking and graftlinking monomers, about 80 weight percent n-butyl acrylate and about 20 weight percent methyl methacrylate.

Another quite useful acrylate based resin impact modifier is an acrylate-styrene-acrylonitrile resin, the so called ASA resin. Such resins are described in Yu et al., U.S. Pat. No. 3,944,631, incorporated herein by reference. Basically, this resin is comprised of from about 10 to about 50 weight percent of a crosslinked acrylate elastomer having a Tg of less than 25° C., from about 5 to about 35 weight percent of a crosslinked styrene-acrylonitrile copolymer, and from about 15 to about 85 weight percent of a non-crosslinked or linear styrene-acrylonitrile copolymer. The composition is made by a three-step sequence comprising emulsion polymerizing of an alkyl (meth)acrylate containing at least one crosslinking monomer, emulsion polymerizing a monomer mixture of styrene, acrylonitrile and at least one crosslinking monomer in the presence of the crosslinked acrylate elastomer formed in the previous step, and finally, emulsion or suspension polymerizing of styrene, acrylonitrile in the presence of the previously formed product.

The acrylic elastomer particles used in preparing these resins comprise crosslinked acrylic polymers or copolymers having a Tg of less than about 25° C. which can be polymerized by means of free radical initiated emulsion techniques. These acrylic elastomer particles are crosslinked so that they can retain their size and shape during subsequent polymer processing steps. This crosslinking is achieved during the polymerization of the elastomer by including a polyfunctional ethylenically unsaturated monomer in the polymerization reaction mixture.

Examples of acrylic elastomers that can be used include the crosslinked polymers of the $C_2$–$C_{10}$ alkyl acrylate and the $C_8$–$C_{22}$ alkyl methacrylate monomers, preferably the $C_4$–$C_8$ alkyl acrylates such as n-butyl acrylate, ethyl acrylate, and 2-ethylhexacrylate. The most preferred acrylate is n-butyl acrylate. At least one acrylate monomer is used in this step. It is also possible to utilize mixtures of two or more different acrylate or methacrylate monomers, as well as mixtures of acrylate and methacrylate monomers. If desired, the monomer charge may optionally contain small amounts, i.e., 1% to 20% by weight of the amount of acrylate monomer, of such monomers as styrene, acrylonitrile, methacrylonitrile, methyl methacrylate, methacrylic acid, acrylic acid, vinylidene chloride, vinyl toluene and any other ethylenically unsaturated monomer copolymerizable with the (meth)acrylate monomer selected for use.

The polyolefins which can be employed as impact modifiers are the homopolymers and the copolymers. Preferred polyolefins are those which are derived from monomers containing from 2 to about 10 carbon atoms. Some illustrative non-limiting examples of these polyolefins include polyethylene, polypropylene, polybutylene, polyhexene, polyisobutylene, and ethylenepropylene copolymer.

Methods for the preparation of the polyolefins are abundantly described in the literature and are well known to those skilled in the art. Polyethylene, for example, can be prepared by various procedures using cationic, anionic or free radical initiating catalysts, with conditions varied to produce a range of molecular weights and densities and various degrees of branching or non-branching. In one procedure, which involves free radical initiation, ethylene gas is polymerized in the presence of a peroxide initiating catalyst at a pressure between 15,000 and 40,000 psi and a temperature between 100° C. and 200° C. to produce a relatively low density polymer, i.e., 0.90 to 0.94 gm/cm$^3$.

The polyethylene can also be prepared by low pressure processes effective to attain a polymer of higher molecular weight and a higher density. In one such procedure, known as the Phillips process, ethylene is contacted in an inert solvent slurry of a catalyst such as chromium oxide supported on silica-aluminum, at pressures of 400 to 500 psig and temperatures of 130° to 170° C., followed by extraction of the polymer with hot solvent and purification, to produce a polyethylene product having a density between 0.96 to 0.97 gm/cm$^3$.

Still other procedures are possible, such as emulsion polymerization in aqueous media in the presence of a peroxy compound, as well as suspension polymerization at low temperatures using a silver salt-peroxide redox system.

Also employable as an impact modifier is polypropylene, a common commercial form of which is isotatic polypropylene. Such polymers can be prepared by anionically initiated reactions using Ziegler type catalysts, e.g., titanium halide such as $TiCl_3$ in combination with an organometallic co-catalyst such as trialkyl aluminum halide. Polymerization proceeds readily at temperatures between 25° C. and 100° C. to yield a polymer in the form of a slurry of insoluble granular powder.

Copolymers of ethylene and propylene can be prepared using procedures similar to those for polyethylene and other polyolefins; for instance by the polymerization reaction of a mixture of ethylene and propylene in the presence of a Ziegler type catalyst or by free-radical initiation under high pressures.

Polymers based on still higher olefins are not as readily available and, therefore, not as preferred. Examples of such higher polyolefins are polymers based on 2-methyl-1-butene, 1-pentene, 4-methyl-1-pentene, and the like. They can be prepared by known procedures including those described in Encyclopedia of Polymer Science and Technology, John Wiley & Sons, Inc., Vol. 9, pp. 440–460, 1965, incorporated herein by reference.

The linear low density polyolefins, such as linear low density polyethylene, may be prepared by state of the art polymerization processes such as those described in U.S. Pat. No. 4,076,698, incorporated herein by reference. The polymers may have a density between 0.89 and 0.96 gm/cc and a controlled concentration of simple side branching as opposed to random branching which distinguishes them from polymers such as high pressure low density polyethylene and high density polyethylene. The preferred range of density is from 0.915 to about 0.945 gm/cc. The linear lo density polyethylenes are made from ethylene and alpha-olefins of 3 to 8 carbon atoms, e.g., butene-1, octene-1, etc. or mixtures thereof. The comonomer is generally used in minor amounts, e.g., 10 mol % or less of the total amount of monomers. A preferred range is about 1–3 mol %. A particularly useful copolymer is made from ethylene and butene such as, for example, ESCORENE LPX-15 marketed by Exxon.

Some particularly useful linear low density polyethylenes are those made from ethylene and a $C_4$–$C_7$ alpha-olefin, as comonomer. Such linear low density polyethylenes, as well as their use as impact modifiers in polycarbonate resins, are described in U.S. Pat. No. 4,563,502, incorporated herein by reference.

Olefin containing copolymers such as olefin acrylates and olefin diene terpolymers can also be utilized as impact modifiers. An example of an olefin acrylate copolymer impact modifier is ethylene ethylacrylate copolymer available from Union Carbide as DPD-6169. Other higher olefin monomers can be employed as copolymers with alkyl acrylates, for example propylene and n-butyl acrylate. The olefins can also be reacted with rubbery dienes so as to form terpolymers of the EPDM family such as ethylene propylene diene terpolymers, for example Epsyn 704 available from Copolymer Rubber Co.

Various rubber polymers can also be employed as impact modifiers. Examples of such rubbery polymers include, but are not limited to, polybutadiene, polyisoprene, styrene-butadiene, and various other polymers or copolymers having a rubbery dienic monomer.

Styrene containing polymers can also be employed as impact modifiers. Examples of such polymers include acrylonitrile-butadiene-styrene, styrene-acrylonitrile, acrylonitrile-butadienealpha-methylstyrene, methacrylate-butadiene-styrene, and other high impact styrene containing polymers.

Other known impact modifiers include various elastomeric materials such as organic silicone rubbers, elastomeric fluorohydrocarbons, elastomeric polyesters, the random block polysiloxane-polycarbonate copolymers, and the like. The thermoplastic organopolysiloxane-polycarbonate random block copolymers are known compounds which are described in U.S. Pat. Nos. 3,189,662, 3,821,325 and 3,832,419, all of which are incorporated herein by reference. Particularly useful organopolysiloxane-polycarbonate block copolymers are the diemthylsiloxane-polycarbonate block copolymers.

All of these impact modifiers are well known in the art, are amply described in the literature, and function to positively upgrade or improve the impact properties, e.g., the impact strength, of thermoplastic aromatic carbonate resins, i.e., the thermoplastic aromatic polycarbonate resins and the thermoplastic aromatic copolyester-carbonate resins.

The anionic aliphatic sulphonates are well known compounds which are commercially available or may be readily prepared by known and conventional methods. These compounds may be represented by

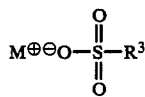 II.

wherein:
$R^3$ is a monovalent aliphatic hydrocarbon radical or substituted monovalent aliphatic hydrocarbon radical; and
M is a cation.

The monovalent aliphatic hydrocarbon radicals represented by $R^3$ include the saturated and the unsaturated aliphatic hydrocarbon radicals. The saturated aliphatic hydrocarbon radicals are the alkyl and cycloalkyl radicals. The unsaturated aliphatic hydrocarbon radicals include the alkenyl radicals. Preferred alkyl radicals are those containing from 1 to about 20 carbon atoms. Preferred cycloalkyl radicals are those containing from 4 to about 16 ring carbon atoms. Preferred alkenyl radicals are those containing from 2 to about 20 carbon atoms and one or two double bonds.

The substituted aliphatic hydrocarbon radicals are those aliphatic hydrocarbon radicals described above which contain substituent groups, preferably from 1 to about 3 substituent groups. The substituent groups may be halogen, nitro, amino, and the like.

Particularly preferred monovalent aliphatic hydrocarbon radicals represented by $R^3$ are the alkyl radicals, with those alkyl radicals containing from 1 to about 20 carbon atoms being the preferred alkyl radicals.

The cation represented by M may generally be any of the known cations. However, the metal cations, particularly the alkali and alkaline earth metals, are the preferred actions, particularly sodium.

Particularly useful aliphatic sulphonates are those available from American Hoechst Corp. under the designation HOSTASTAT HS I. These are in the form of a granular powder having a maximum particle size of 5 mm and are the sodium salt of a mixture of $C_{12}$ to $C_{18}$ aliphatic hydrocarbons.

The amount of aliphatic sulphonate used is critical and is an amount which is effective to improve the impact properties of the aromatic carbonate resin/impact modifier blends, but insufficient to substantially deleteriously affect, to a substantial degree, substantially most of the other advantageous properties of the resin. That is to say, an amount which when combined with the impact modifier improves or enhances the impact property improving characteristics thereof, i.e., an impact property enhancing amount. This enables the impact properties of the resin to be improved while using less of the impact modifier. Generally, this amount of sulphonate is from about 0.4 to below about 3 weight %, preferably from about 0.5 to about 2.5 weight %, and more preferably from about 0.75 to about 2 weight %. Weight % sulphonate is based on the total amounts of sulphonate and carbonate resin present.

The amount of impact modifier present in the instant compositions is an amount which, when used in conjunction or combination with the aliphatic sulphonate, is effective to improve the impact properties of the aromatic carbonate resin. Generally, this amount should be at least about 1 weight percent, preferably at least about 2 weight percent. The amount of impact modifier present should generally not exceed about 15 weight percent, preferably about 10 weight percent. Weight percent impact modifier present is calculated based on the amounts of impact modifier and aromatic carbonate resin present.

In conventional impact modified aromatic carbonate resin compositions the presence of at least about 4 weight percent of impact modifier is needed to notice a significant improvement in impact properties. In the compositions of the present invention an improvement in impact properties of the aromatic carbonate resin is generally noticeable at amounts as low as one weight percent of impact modifier and is significant at amounts of at least about 2 weight percent.

The instant compositions thus contain a combined amount of impact modifier and aliphatic sulphonate which is effective to improve the impact properties of the aromatic carbonate resin. This combined amount is generally at least about 0.4 weight percent of aliphatic sulphonate and at least about 1 weight percent of impact modifier, preferably at least about 0.5 weight percent of said sulphonate and at least about 2 weight percent of said impact modifier. The maximum amounts of combined impact modifier and aliphatic sulphonate that are present are amounts which are insufficient to significantly deleteriously affect, to a significant degree, substantially most of the advantageous properties of the aromatic carbonate resin. This amount should generally be less than about 3 weight percent of said sulphonate and less than about 15 weight percent of said impact modifier, preferably it should not exceed about 2.5 weight percent of said sulphonate and about 10 weight percent of said impact modifier.

The compositions of the instant invention may optionally contain the commonly known and used additives for aromatic carbonate resin such as fillers such as glass, talc, mica, clay; antioxidants; colorants; ultraviolet radiation stabilizers such as the benzophenones, benzotriazoles, and cyanoacrylates; mold release agents; hydrolytic stabilizers such as the epoxides; color stabilizers; and flame retardants such as the alkali and alkaline earth metal salts of organic sulfonic acids which are described, inter alia, in U.S. Pat. Nos. 3,933,734, 3,931,100, 3,978,024, 3,948,851, 3,926,908, 3,919,167, 3,909,490, 3,953,396, 3,953,399, 3,917,559, 3,951,910, 3,940,366 and 3,775,367, all of which are incorporated by reference.

DESCRIPTION OF THE PREFERRED EMBODIMENT

In order to more fully and clearly illustrate the present invention the following examples are set forth. It is intended that these examples be considered as illustrative rather than limiting the invention as disclosed and claimed herein.

The following examples illustrate compositions falling outside the scope of the instant invention. They are presented for comparative purposes only.

EXAMPLE 1

A blend was prepared by thoroughly mixing 100 parts by weight of a polycarbonate resin comprised of the reaction products of bisphenol-A and phosgene, with 2 parts by weight per hundred parts by weight of resin of a linear low density polyethylene. This mixture was fed to an extruder operating at about 265° C. to extrude the mixture into strands and the strands were chopped into pellets. The pellets were then injection molded at about 298° C. into test samples measuring about $2\frac{1}{2}''\times 1\frac{1}{2}''\times \frac{1}{8}''$ and $\frac{1}{8}''\times 1\frac{1}{2}''\times \frac{1}{4}''$. These samples were then tested for their impact strength in accordance with ASTM D256.

The Kasha Index (KI) of this mixture was also determined. The Kasha Index is an indication or measurement of the processability of the resin mixture. The lower the KI the greater the melt flow rate and, therefore, the better the processability of the resin. Basically, the Kasha Index is a measurement of the melt viscosity of the resin. The procedure for determining the Kasha Index is as Follows: 7 grams of resin pellets, dried a minimum of 90 minutes at 125° C., are added to a modified Tinius-Olsen model T-3 melt indexer; the temperature in the indexer is maintained at 300° C. and the resin is heated at this temperature for 6 minutes; after 6 minutes the resin is forced through a 0.04125 inch radius orifice using a plunger of radius of 0.1865 inch and an applied force of 17.7 pounds; the time required for the plunger to travel 2 inches is measured in centiseconds and this is reported as the KI. The higher the KI the higher the melt viscosity of the resin, and, therefore, the more difficult it is to process. The results of this test, as well as the results of the Notched Izod impact strength test are set forth in Table I.

EXAMPLE 2

The procedure of Example 1 is substantially repeated except that 3 parts by weight of linear low density polyethylene are mixed with 100 parts by weight of polycarbonate resin.

The KI and Notched Izod test results are set forth in Table I.

EXAMPLE 3

The procedure of Example 1 is substantially repeated except that 4 parts by weight of linear low density polyethylene are mixed with 100 parts by weight of polycarbonate resin.

The KI and Notched Izod test results are set forth in Table I.

EXAMPLE 4

A blend was prepared by thoroughly mixing 100 parts by weight of the polycarbonate resin of Example 1 and 1 part by weight of an aliphatic sulphonate (HOSTASTAT HS 1 of American Hoechst Corp.). Test samples were prepared in accordance with the procedure of Example 1. The Notched Izod impact strength and the KI were determined, and the results are set forth in Table I.

EXAMPLE 5

The procedure of Example 4 is substantially repeated except that 3 parts by weight of the aliphatic sulphonate of Example 4 were mixed with 100 parts by weight of the polycarbonate resin of Example 1.

The KI and Notched Izod impact strengths were determined, and the results are set forth in Table I.

The following examples illustrate the compositions of the present invention.

EXAMPLE 6

A blend was prepared by thoroughly mixing 100 parts by weight of the polycarbonate resin as used in Example 1, 2 parts by weight of the linear low density polyethylene as used in Example 1, and 1 part by weight of the aliphatic sulphonate as used in Example 4. Test samples were prepared substantially in accordance with the procedure of Example 1.

The KI and Notched Izod impact strengths were determined and the results are set forth in Table I.

EXAMPLE 7

A blend was prepared substantially in accordance with the procedure of Example 6 except that 100 parts by weight of polycarbonate resin, 4 parts by weight of linear low density polyethylene, and 1 part by weight of aliphatic sulphonate were used.

The KI and Notched Izod impact strengths were determined and the results are set forth in Table I.

The following example illustrates a composition falling outside the scope of the instant invention as it contains an amount of aliphatic sulphonate which falls outside the scope of the instant invention, i.e., is 3 weight percent.

EXAMPLE 8

A blend was prepared substantially in accordance with the procedure of Example 6 except that 100 parts by weight of the polycarbonate resin, 3 parts by weight of the aliphatic sulphonate, and 3 parts by weight of the linear low density polyethylene were used.

The KI and Notched Izod impact strengths were determined and the results are set forth in Table I.

TABLE I

| COMPOSITION (parts by weight) | Example No. | | | | | | | |
|---|---|---|---|---|---|---|---|---|
| | 1 | 2 | 3 | 4 | 5 | 6*** | 7*** | 8 |
| polycarbonate | 100 | 100 | 100 | 100 | 100 | 100 | 100 | 100 |
| LLDPE (LPX-15)* | 2 | 3 | 4 | 0 | 0 | 2 | 4 | 3 |
| Hostastat HS-1 | 0 | 0 | 0 | 1 | 3 | 1 | 1 | 3 |
| 3.2 mm Notched Izod (Kg.cm/cm) | $84.9^{100**}$ | $81.6^{100}$ | $85.4^{100}$ | $86.5^{100}$ | $27.2^{0}$ | $89.8^{100}$ | $82.7^{100}$ | $59.3^{100}$ |
| 6.4 mm Notched Izod (Kg.cm/cm) | $15.8^{0}$ | $19.0^{0}$ | $25.0^{0}$ | $20.7^{0}$ | $2.7^{0}$ | $70.2^{100}$ | $63.6^{100}$ | $32.1^{0}$ |
| KI at 300° C., CSEC | 3150 | 2550 | 2440 | 2850 | 1280 | 3100 | 2330 | 1870 |

*linear low density polyethylene with butene-1 obtained from Exxon Chemical Co.
**The superscript denotes percent of bars which failed (broke) in a ductile manner.
***Examples within the scope of the instant invention.

As illustrated by the data in Table I the conventional prior art blends containing a conventional impact modifier alone, i.e., linear low density polyethylene (Examples 1–3), exhibit improved impact properties as compared with neat polycarbonate resin. The addition of minor amounts, i.e., 1 part by weight, of the aliphatic sulphonate to blends containing a polycarbonate resin and a linear low density polyethylene, dramatically improves the thick section impact properties of these compositions (Examples 6 and 7), changing the break or failure mode of the test pieces from brittle to ductile. The addition of only the aliphatic sulphonate to the polycarbonate resin (Examples 4 and 5) does not change the break mode of the thick section test samples, i.e., the break mode is still brittle as in Examples 1–3.

As illustrated by the data for Example 8 exceeding the critical upper limit of the concentration of the aliphatic sulphonate in the compositions, i.e., less than about 3 weight percent, results in an actual decrease or downgrading of the impact properties in thick section of blends containing linear low density polyethylene and polycarbonate resin.

While the invention has been described above with respect to the preferred embodiments thereof, it will be understood by those skilled in the art that various changes and modifications may be made thereto without departing from the spirit or scope of the invention.

What is claimed is:

1. A composition comprising
   (a) an aromatic carbonate resin;
   (b) about 1 to 10 weight percent of a polyolefin based on the weight of (a) and (b)
   (c) an amount effective to improve the impact properties of (a) and (b) of an aliphatic sulfonate wherein the amount of aliphatic sulfonate is from about 0.5 to about 2.5 weight percent based upon the total amounts of aliphatic sulfonate and aromatic carbonate.
2. The composition of claim 1 wherein the aromatic carbonate resin is a polycarbonate resin.
3. The composition in accordance with claim 2 wherein the polycarbonate is bisphenol-A polycarbonate.
4. The composition of claim 1 wherein the polyolefin is present in from about 2 to about 10 weight percent.
5. The composition in accordance with claim 1 wherein the polyolefin is a linear low density polyolefin.
6. The composition in accordance with claim 5 wherein the linear low density polyolefin is a linear low density ethylene.
7. The composition of claim 1 wherein the aliphatic group is an alkyl from about 12 to about 20 carbon atoms inclusive.
8. The composition of claim 3 wherein the polyolefin is linear low density polyethylene.

* * * * *

UNITED STATES PATENT AND TRADEMARK OFFICE
CERTIFICATE OF CORRECTION

PATENT NO. : 4,873,277
DATED     : October 10, 1989
INVENTOR(S) : Omar Mohamed Boutni It is certified that error appears in the above-identified patent and that said Letters Patent is hereby corrected as shown below:

Column 6, line 3, "multiacrylate" should read --multiphase--.

Signed and Sealed this

Twentieth Day of November, 1990

Attest:

HARRY F. MANBECK, JR.

Attesting Officer

Commissioner of Patents and Trademarks